United States Patent
Choi et al.

(10) Patent No.: US 8,423,006 B2
(45) Date of Patent: Apr. 16, 2013

(54) METHOD AND SYSTEM FOR PROVIDING TRANSFER SERVICE BETWEEN MOBILE TERMINAL AND TELEMATICS TERMINAL

(75) Inventors: Jong-Hyuk Choi, Seoul (KR);
Byung-Koo Ahn, Seoul (KR)

(73) Assignee: KT Corporation, Gyeonggi-do (KR)

( * ) Notice: Subject to any disclaimer, the term of this patent is extended or adjusted under 35 U.S.C. 154(b) by 0 days.

(21) Appl. No.: 13/562,327

(22) Filed: Jul. 31, 2012

(65) Prior Publication Data

US 2012/0289210 A1  Nov. 15, 2012

Related U.S. Application Data

(63) Continuation of application No. 12/600,614, filed as application No. PCT/KR2008/002754 on May 16, 2008, now Pat. No. 8,260,276.

(30) Foreign Application Priority Data

May 17, 2007 (KR) ......................... 10-2007-0048320
Jun. 11, 2007 (KR) ......................... 10-2007-0056756

(51) Int. Cl.
  *H04M 3/42* (2006.01)
  *H04M 1/00* (2006.01)
(52) U.S. Cl.
  USPC ................... 455/417; 455/569.2; 455/414.1
(58) Field of Classification Search .............. 455/417, 455/566, 567, 569.1, 569.2, 414.1
  See application file for complete search history.

(56) References Cited

U.S. PATENT DOCUMENTS

| | | | |
|---|---|---|---|
| 6,965,787 B2 | 11/2005 | Kindo et al. | |
| 6,970,703 B2 | 11/2005 | Fuchs et al. | |
| 7,245,951 B2 | 7/2007 | Oesterling et al. | |
| 7,443,972 B1 | 10/2008 | Barlow et al. | |
| 7,471,929 B2 | 12/2008 | Fujioka et al. | |
| 7,545,262 B2 * | 6/2009 | Batchik ........................ | 340/438 |
| 7,672,665 B2 | 3/2010 | Sobb et al. | |
| 7,856,297 B2 | 12/2010 | Ampunan et al. | |

(Continued)

FOREIGN PATENT DOCUMENTS

JP   2006-295809 A   10/2006
KR   10-2004-0010935 A   2/2004

(Continued)

OTHER PUBLICATIONS

Korean Intellectual Property Office, International Search Report for International Application No. PCT/KR2008/002749, Oct. 8, 2008.

(Continued)

*Primary Examiner* — Christopher M Brandt
(74) *Attorney, Agent, or Firm* — IP Legal Services, LLC

(57) ABSTRACT

The present invention relates to method and system for releasing terminal switching between a mobile terminal and a telematics terminal, and the method according to the present invention comprises receiving from the mobile terminal a terminal switching release request including an identification code representing terminal switching release; restoring information of the mobile terminal by inactivating information of the telematics terminal set as information of the mobile terminal in a home location register and activating information of the mobile terminal based on the identification code; and transmitting a mobile terminal activation command to a first switching center, where the mobile terminal is located, to allow a mobile communication service of the mobile terminal.

8 Claims, 7 Drawing Sheets

U.S. PATENT DOCUMENTS

| | | | |
|---|---|---|---|
| 7,865,282 B2 | 1/2011 | Murlidar et al. | |
| 7,873,392 B2 | 1/2011 | Matsuda | |
| 8,116,836 B2 | 2/2012 | Ki | |
| 2002/0046285 A1 | 4/2002 | Yasushi et al. | |
| 2002/0098853 A1 | 7/2002 | Chrumka | |
| 2003/0032460 A1* | 2/2003 | Cannon et al. | 455/569 |
| 2003/0065427 A1 | 4/2003 | Funk et al. | |
| 2003/0128103 A1* | 7/2003 | Fitzpatrick et al. | 340/425.5 |
| 2003/0224840 A1* | 12/2003 | Frank et al. | 455/575.9 |
| 2005/0018613 A1 | 1/2005 | Yokota | |
| 2005/0049021 A1 | 3/2005 | Nedelcu et al. | |
| 2005/0085221 A1* | 4/2005 | Sumcad | 455/415 |
| 2005/0130723 A1 | 6/2005 | Grivas et al. | |
| 2005/0149564 A1 | 7/2005 | Jain et al. | |
| 2005/0282579 A1 | 12/2005 | Kim | |
| 2006/0030298 A1* | 2/2006 | Burton et al. | 455/412.1 |
| 2006/0038674 A1* | 2/2006 | Sumcad et al. | 340/539.18 |
| 2006/0052092 A1 | 3/2006 | Schwinke et al. | |
| 2006/0149457 A1 | 7/2006 | Ross et al. | |
| 2006/0154659 A1 | 7/2006 | Roter et al. | |
| 2006/0268899 A1 | 11/2006 | Lim | |
| 2007/0022177 A1 | 1/2007 | Kwon | |
| 2007/0086579 A1 | 4/2007 | Lorello et al. | |
| 2007/0093200 A1 | 4/2007 | Dobosz | |
| 2007/0238491 A1 | 10/2007 | He | |
| 2008/0119240 A1 | 5/2008 | Ampunan et al. | |
| 2009/0280870 A1 | 11/2009 | Muttschall et al. | |

FOREIGN PATENT DOCUMENTS

| | | |
|---|---|---|
| KR | 10-2004-0045805 A | 6/2004 |
| KR | 10-2005-0023139 A | 3/2005 |
| KR | 10-2005-0077438 A | 8/2005 |
| KR | 10-2005-0090579 A | 9/2005 |
| KR | 10-2006-0099760 A | 9/2006 |

OTHER PUBLICATIONS

Korean Intellectual Property Office, Written Opinion of the International Searching Authority for International Application No. PCT/KR2008/002749, Oct. 8, 2006.

Korean Intellectual Property Office, International Search Report for International Application No. PCT/KR2008/002753, Oct. 21, 2008.

Korean Intellectual Property Office, Written Opinion of the international Searching Authority for International Application No. PCT/KR2008/002753, Oct. 21, 2008.

Korean Intellectual Property Office, international Search Report for International Application No, PCT/KR2008/002754, Oct. 13, 2008.

Korean Intellectual Property Office, Written Opinion of the International Searching Authority for International Application No. PCT/KR2008/002754, Oct. 13, 2008.

* cited by examiner

FIG. 5

| SUBSCRIBER INFORMATION | TERMINAL INFORMATION | TERMINAL SWITCHING FLAG | LOCATION INFORMATION |
|---|---|---|---|
| 010-111-XXXX | TERMINAL 1 | 0 | RN1 |
| | | 1 | RN2 |
| 010-111-YYYY | TERMINAL 2 | 0 | RN3 |
| | | 1 | RN4 |
| ⋮ | | | |

METHOD AND SYSTEM FOR PROVIDING TRANSFER SERVICE BETWEEN MOBILE TERMINAL AND TELEMATICS TERMINAL

CROSS REFERENCE TO RELATED APPLICATIONS

This application is a continuation of pending U.S. patent application Ser. No. 12/600,614 (filed on Nov. 17, 2009), which is a National Stage Patent Application of PCT International Patent Application No. PCT/KR2008/002754 (filed on May 16, 2008) under 35 U.S.C. §371, which claims priority to Korean Patent Application Nos. 10-2007-0048320 (filed on May 17, 2007) and 10-2007-0056756 (filed on Jun. 11, 2007), the teachings of which are incorporated herein in their entireties by reference.

TECHNICAL FIELD

The present invention relates to communication terminal switching, and in particular, to terminal switching from a mobile terminal to a telematics terminal.

BACKGROUND ART

To transfer all profiles of an existing mobile terminal to a new mobile terminal, currently a procedure for terminal change or terminal cancel and reopening is required, which is not one-time property, but an eternal property. And, subsequent to profile transfer, for restoration to an original state, the above-mentioned procedure should be repeated.

Meanwhile, recently WCDMA (Wideband CDMA) system capable of video communication is introduced, and in the case a mobile subscriber wants to use from a mobile terminal in use to another mobile terminal, the mobile subscriber separates a smart card (for example, USIM (Universal Subscriber Identity Module)) mounted in the mobile terminal in use and mounts the separated smart card in the another mobile terminal, and then the mobile subscriber uses the another mobile terminal. The separating and mounting of the smart card is a cumbersome work. Therefore, a solution is required to overcome the disadvantage, which allows the mobile subscriber to use freely from a mobile terminal in use to another mobile terminal.

And, recently, a telematics service provides various multimedia functions, for example navigation that guides a driver and passengers to destination, burglar alarm, emergent rescue (SOS), remote diagnostics, expendables management, a hands-free mobile phone, living information, personal information, secretary service or Internet connection. In particular, a telematics terminal with the telematics service has an embedded mobile communication module, and thus the telematics terminal can provide mobile communication, and in the case that the telematics terminal is connected to an external mobile phone of a user, the telematics terminal can provide mobile communication hands-free.

However, in the same way that mobile terminals are incompatible with each other, a telematics terminal and a mobile terminal are utterly incompatible with each other. After a mobile subscriber directly connects his/her mobile terminal to a telematics terminal by a cable, the mobile subscriber can use mobile communication hands-free, however a profile of the mobile terminal is not automatically switched to the telematics terminal. In other words, to prevent a car accident, when a mobile subscriber gets in a vehicle, the mobile subscriber should use a mobile phone service hands-free, however conventionally the mobile subscriber connects a mobile terminal to a telematics terminal by a cable to use a mobile phone service hands-free. This causes inconvenience, and because a telematics terminal with a mobile phone function is used only as a conventional hands-free mobile phone, favorable functions of the telematics terminal are not fully utilized.

DISCLOSURE

Technical Problem

The present invention is designed to solve the above-mentioned problems, and therefore it is an object of the present invention to provide terminal switching service method and system, which performs terminal switching from a mobile terminal to a telematics terminal to receive a mobile communication service provided to the mobile terminal by the telematics terminal.

And, it is another object of the present invention to provide terminal switching service method and system, which subsequent to terminal switching, releases terminal switching to receive a mobile communication service by a mobile terminal again.

Further, it is another object of the present invention to provide method and system for providing a call information message of a non-received call in a terminal switching service, which transmits a call information message of a non-received call to a mobile terminal in a non-receiving state of a terminal-switched telematics terminal.

And, these and other features, aspects, and advantages of the present invention will be more fully described in the preferred embodiments of the present invention. And, the objects and advantages of the present invention can be implemented by configurations recited in the claims singularly or in combination.

Technical Solution

In order to achieve the above-mentioned objects, a method for providing a terminal switching service between a mobile terminal and a telematics terminal according to a first aspect of the present invention, which releases a terminal switching state from a mobile terminal to a telematics terminal in a mobile communication system, comprises receiving from the mobile terminal a terminal switching release request including an identification code representing terminal switching release; restoring information of the mobile terminal by inactivating information of the telematics terminal set as information of the mobile terminal in a home location register and activating information of the mobile terminal based on the identification code; and transmitting a mobile terminal activation command to a first switching center, where the mobile terminal is located, to allow a mobile communication service of the mobile terminal.

And, a system for providing a terminal switching service between a mobile terminal and a telematics terminal according to a second aspect of the present invention, which releases terminal switching made from a mobile terminal to a telematics terminal in a mobile communication network, the system comprises a first switching center serving as a switching center for the mobile terminal and configured to receive from the mobile terminal a terminal switching release request including an identification code representing terminal switching release; a terminal switching service device configured to receive the terminal switching release request from the first switching center based on the identification code; a first home location register serving as a home location register for the mobile terminal and configured to restore information of the mobile terminal by inactivating information of the telematics terminal set as information of the mobile terminal and activating information of the mobile terminal according to command of the terminal switching service device; and a second switching center serving as a switching center for the telematics terminal and configured to restore a profile information of the mobile terminal set as a profile information of the telematics terminal to a profile information of the telematics terminal, wherein the first switching center receives a mobile terminal activation command from the first home location register to release interception of a mobile communication service of the mobile terminal.

And, a method for providing a call information message of a non-received call in a terminal switching service according to a third aspect of the present invention, which provides a call information message of a non-received call in a terminal switching state from a mobile terminal to a telematics terminal in a mobile communication system, comprises processing a call destined for the mobile terminal by the telematics terminal; in the case that the telematics terminal is in a non-receiving state, writing a call information message of a non-received call; and temporarily allowing the mobile terminal to receive the written call information message and transmitting the written call information message to the mobile terminal.

Further, a system for providing a call information message of a non-received call in a terminal switching service according to a fourth aspect of the present invention, which provides a call information message of a non-received call in a terminal switching state from a mobile terminal to a telematics terminal, comprises a first switching center serving as a switching center for the telematics terminal and configured to process a call destined for the mobile terminal by the telematics terminal; a home location register for storing a profile information of the mobile terminal, and in the case that the telematics terminal is in a non-receiving state, receiving from the first switching center a request for transmission of a call information message of a non-received call; a call information providing device for writing a call information message of a non-received call and transmitting the call information message via a message center at the request of the home location register; and a second switching center serving as a switching center for the mobile terminal and configured to receive the call information message, temporarily allowing the mobile terminal to receive the call information message, and transmitting the call information message to the mobile terminal.

DESCRIPTION OF DRAWINGS

FIG. 5 is a view illustrating an example of a table stored in a home location register.

BEST MODE

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
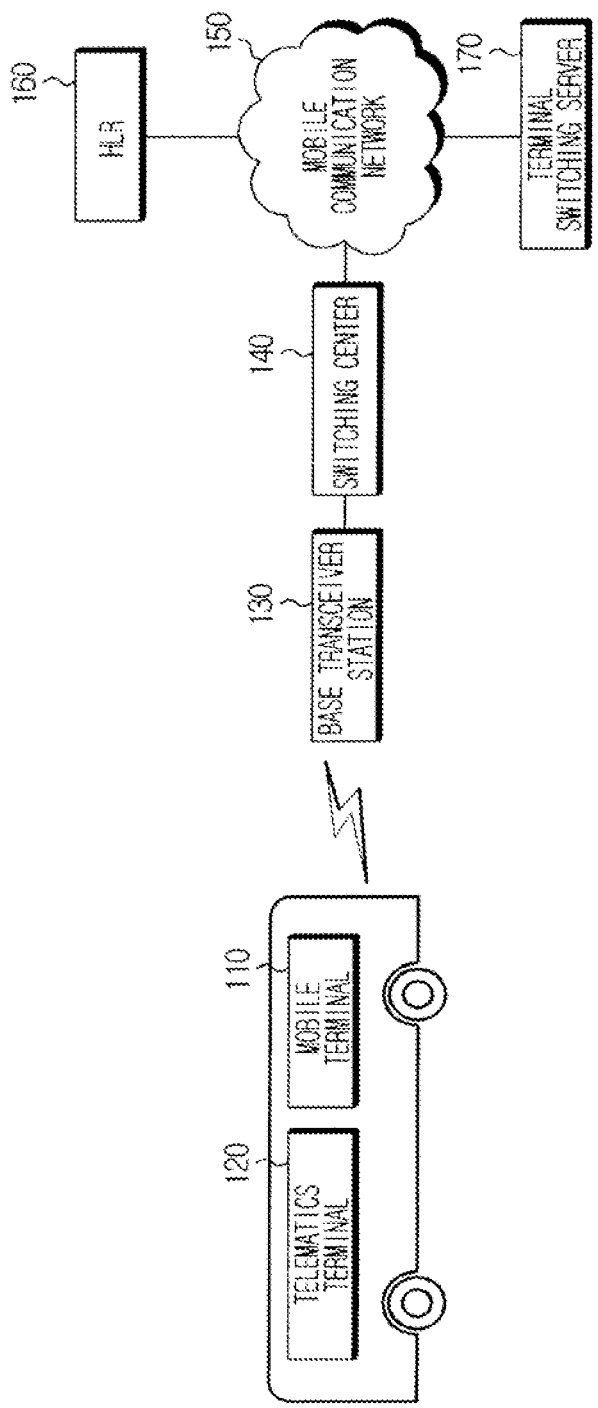
FIG. 1 is a view illustrating a network configuration of a terminal switching service system according to an embodiment of the present invention.

FIG. 1 is a view illustrating a network configuration of a terminal switching service system according to an embodiment of the present invention.

As shown in FIG. 1, the terminal switching service system according to the present invention comprises a mobile terminal 110 of a mobile subscriber, a telematics terminal 120 mounted in a vehicle, a base transceiver station 130, a switching center 140, a mobile communication network 150, a home location register 160 and a terminal switching server 170.

The mobile subscriber carries the mobile terminal 110 and gets in a vehicle, and switches a mobile communication service from the mobile terminal 110 to the telematics terminal 120, so that the subscriber receives the mobile communication service provided to the mobile terminal 110 by the telematics terminal 120. At this time, if the mobile terminal 110 is a terminal capable of voice or video communication and text message sending and receiving, the mobile terminal 110 is not limited to a specific kind of terminal. For example, the mobile terminal 110 includes PDA (Personal Digital Assistant), a cellular phone, a PCS (Personal Communication Service) phone, a GSM (Global System for Mobile) phone, a W-CDMA phone, a CDMA-2000 phone or an MBMS (Multimedia Broadcast and Multicast Service) phone. And, the telematics terminal 120 provides a typical telematics service, and in particular, provides a mobile communication service through an embedded mobile communication module. The telematics terminal 120 is assigned a separate phone number and provides a mobile communication service in the same way as the mobile terminal 110.

The mobile subscriber gets in the vehicle, connects to the terminal switching server 170 by the telematics terminal 120, selects the mobile terminal 110 for terminal switching, and requests terminal switching. At this time, the terminal switching server 170 provide the telematics terminal 120 with a list of a plurality of mobile terminals, and receives selection of any one mobile terminal among the list from the mobile subscriber. For example, a family having one vehicle subscribes for a terminal switching service, sets the telematics terminal 120 as an object for terminal switching, and sets information of mobile terminals 110 of each member of the family. In the case that a member of the family gets in the vehicle and drives the vehicle, the driver connects to the terminal switching server 170 by the telematics terminal 120, selects his/her mobile terminal among the mobile terminal list of the family provided from the terminal switching server 170 and requests terminal switching.

At this time, in the case that the engine starts, the telematics terminal 120 may be automatically connected to the terminal switching server 170. An electronic control unit of the vehicle senses the starting and transmits a control signal to the telematics terminal 120 according to sensing of engine starting, and the telematics terminal 120 is automatically connected to the terminal switching server 170.

Alternatively, the mobile subscriber may directly input a telephone number of his/her mobile terminal 110 into the telematics terminal 120 to request terminal switching to the terminal switching server 170. Thus, the mobile terminal 110 of the mobile subscriber who drives the vehicle is inactivated, and the telematics terminal 120 is activated, so that the mobile subscriber can use a mobile communication service by the telematics terminal 120, not by the mobile terminal 110.

In alternative embodiments, the telematics terminal 120 may automatically set a telephone number of a specific mobile terminal to request terminal switching to the terminal switching server 170. This can be applied only in the case that one mobile subscriber for the telematics terminal 120 subscribed for a terminal switching service. The exemplary terminal switching request method may be easily changed, altered or modified by persons skilled in that art within the above-mentioned range.

The base transceiver station (BTS/NodeB) 130 is connected with the telematics terminal 120 and the mobile terminal 110 wirelessly to control each terminal 110 and 120 and connect a traffic channel, and receives an outgoing call from each terminal 110 and 120 and transmits the outgoing call to a base station controller/radio network controller (BSC/RNC)(not shown). The base station controller/radio network controller controls the base transceiver station 130, and performs wireless channel assignment and release on each terminal 110 and 120, transmitter power control of each terminal 110 and 120 and the base transceiver station 130, determination of soft handoff and hard handoff between cells, transcoding and vocoding, or management and maintenance and repair of the base transceiver station 130

The switching center 140 performs basic and additional service processing, processing of incoming and outgoing calls of a subscriber, location registration and handoff, or interworking with other network, i.e. a public network or an intelligent network system. In particular, after terminal switching, the switching center 140 intercepts a call originated from the mobile terminal 110, and provides the telematics terminal 120 with a voice/video call destined for the mobile terminal 110. Preferably, the switching center 140 stores and manages an inactive information of the mobile terminal 110 and intercepts a service of the mobile terminal 110, and stores an identification information (for example, MSISDN (Mobile Subscriber International Subscriber Directory Number) of the mobile terminal 110 corresponding to IMSI (International Mobile Subscriber Identity) of the telematics terminal 120 and provides the telematics terminal 120 with a mobile communication service destined for the mobile terminal 110 using the identification information.

Meanwhile, after terminal switching, the switching center 140 intercepts all calls originated from the mobile terminal 110, and may not intercept an outgoing call for a specific function. For example, when the mobile subscriber uses the telematics terminal 120 after terminal switching, although the mobile subscriber wants to release the terminal switching, call origination of the mobile terminal 110 is intercepted, so it is not possible to release terminal switching by the mobile terminal 110. Therefore, in the case that an outgoing call for terminal switching release is transmitted from the mobile terminal 110, the switching center 140 allows origination of the corresponding call, so that terminal switching is released. Preferably, the switching center 140 stores and manages a function code information for terminal switching release, and when an outgoing call including the function code is transmitted from the mobile terminal 110, the switching center 140 refers to the function code and allows origination of the corresponding outgoing call.

The mobile communication network 150 is connected with the switching center 140, the home location register 160 and the terminal switching server 170, and provides interface and signaling between each network equipment. Preferably, the mobile communication network includes No. 7 network, and each network equipment operates while being connected to the No. 7 network.

The home location register (HLR) 160 is a database for storing a service profile about a subscriber information of each terminal 110 and 120, and stores and manages an identification number (IMSI or MSISDN), an additional service information and a location information of each terminal 110 and 120, and information necessary for terminal switching according to the present invention.

Preferably, the home location register 160 stores and manages a location information of each terminal 110 and 120, and in the case that the mobile subscriber requests to switch from the mobile terminal 110 to the telematics terminal 120, the home location register 160 inactivates information of the mobile terminal 110 and activates information of the telematics terminal 120, so that a mobile communication service (for example, a voice/video call) provided to the mobile terminal 110 is provided to the telematics terminal 120.

On the contrary, in the case that the mobile subscriber requests to release terminal switching, the home location register 160 activates information of the mobile terminal 110 and inactivates information of the telematics terminal 120, so that a mobile communication service (for example, a voice/video call) is provided to the mobile terminal 110 as originally provided.

FIG. 5 is a view illustrating an example of a table stored in the home location register 160, and as shown in FIG. 5, according to terminal switching request of the mobile subscriber, the home location register 160 activates/inactivates a location information of the mobile terminal 110 of the mobile subscriber and inactivates/activates a location information of the telematics terminal 120 (that is, sets a terminal switching flag to '1' or '0'). Specifically, in the case that the mobile subscriber using the mobile terminal 110 of a telephone number [010-111-xxxx] requests terminal switching, the home location register 160 that stores a profile information of the mobile terminal 110 of the corresponding mobile subscriber, inactivates a location information (RN1) of the mobile terminal 110 of the corresponding mobile subscriber (sets a terminal switching flag to '0') and activates a location information of the telematics terminal 120 (sets a terminal switching flag to '1') by setting a location information (RN2) of the telematics terminal 120 to a location information of the mobile terminal 110. On the contrary, in the case of terminal switching release, the home location register 160 inactivates a location information (RN2) of the telematics terminal 120 (sets a terminal switching flag to '0') and activates a location information (RN1) of the mobile terminal 110 (sets a terminal switching flag to '1').

The terminal switching server 170 stores and manages a terminal switching service subscriber information, and according to terminal switching request to a mobile subscriber, the terminal switching server 170 provides terminal switching of the mobile terminal 110, and stores and manages information according to terminal switching. Preferably, when receiving a terminal switching request from the mobile subscriber, the terminal switching server 170 inactivates information of the mobile terminal 110 stored in the home location register 160, and activates information of the telematics terminal 120 stored in the home location register 160. And, when receiving a terminal switching release request from the mobile subscriber, the terminal switching server 170 activates information of the mobile terminal 110 stored in the home location register 160 and inactivates information of the telematics terminal 120 stored in the home location register 160.

Figure 2:
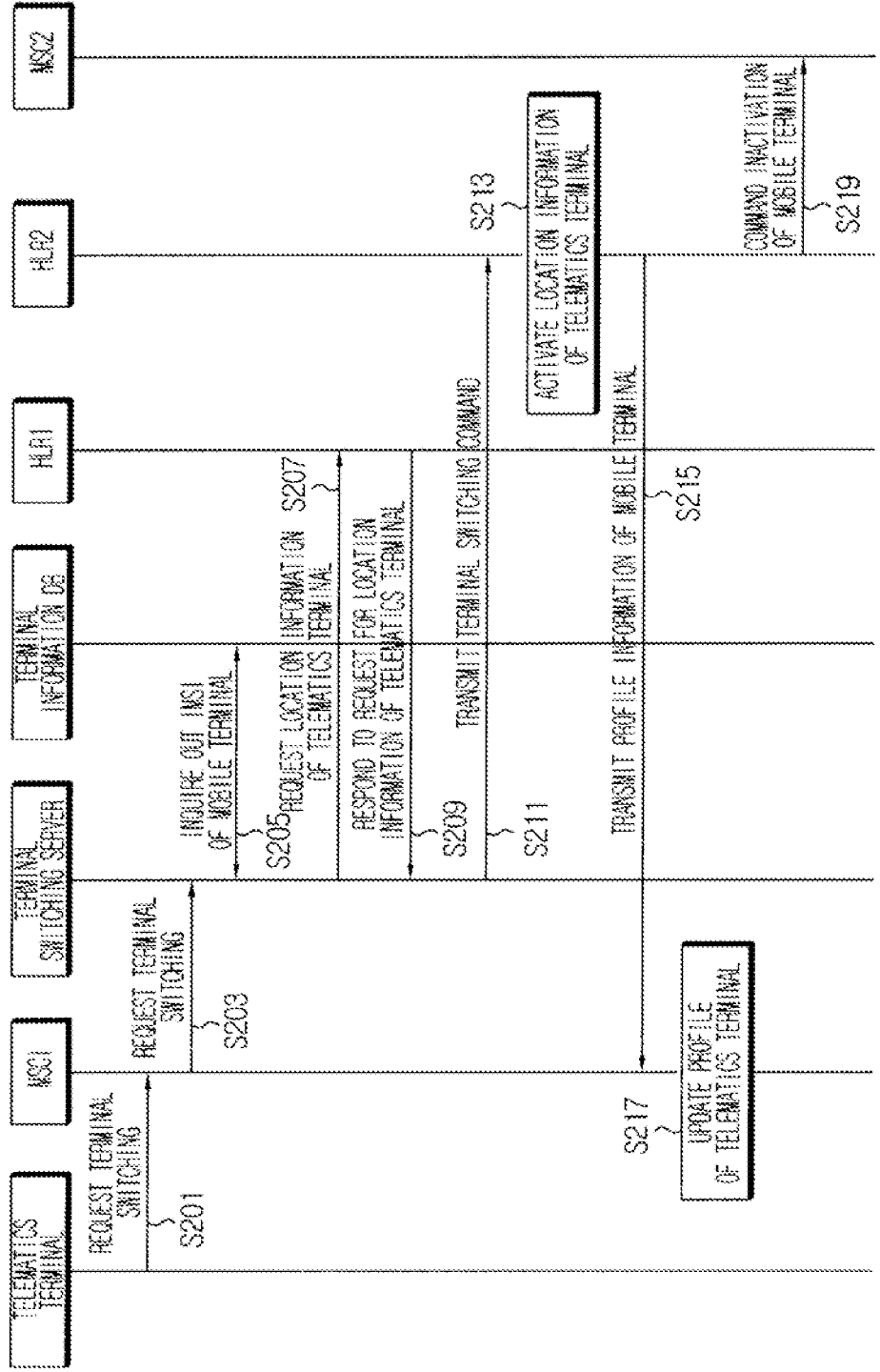
FIG. 2 is a flow chart illustrating a step for setting terminal switching in the terminal switching service system according to an embodiment of the present invention.

FIG. 2 is a flow chart illustrating a step for setting terminal switching in the terminal switching service system according to an embodiment of the present invention.

As shown in FIG. 2, first, to switch from the mobile terminal 110 to the telematics terminal 120, a mobile subscriber requests terminal switching to the terminal switching server 170 using the telematics terminal 120. In the case of terminal switching request using the telematics terminal 120, the telematics terminal 120 transmits to the switching center 140 a terminal switching request signal including an identification information (for example, MSISDN) of the mobile terminal 110 via a wireless section (S201). Subsequently, the switching center 140 transmits to the terminal switching server 170 the terminal switching request signal including the identification information of the mobile terminal 110 (S203). At this time, preferably the switching center 140 transmits the terminal switching request signal to the home location register 160, receives a routing information toward the terminal switching server 170 in response to the terminal switching request signal, and transmits to the terminal switching server 170 the terminal switching request signal including the identification information of the mobile terminal 110.

Here, a subscriber certification step may be performed between the telematics terminal 120 and the terminal switching server 170. That is, the terminal switching server 170 requires the telematics terminal 120 to input a password, and compares the inputted password with the terminal switching service subscriber information to perform subscriber certification. In this embodiment, the mobile subscriber requests terminal switching by inputting a telephone number of the mobile terminal 110 into the telematics terminal 120, however, in alternative embodiments, the mobile subscriber may not input a telephone number of the mobile terminal 110 into the telematics terminal 120, but instead the terminal switching server 170 may perform subscriber certification, extract information of a plurality of mobile terminals 110 stored in the telematics terminal 120 and provide the mobile subscriber with the extracted information to allow the mobile subscriber to select an object mobile terminal for terminal switching.

The terminal switching server 170 receives the terminal switching request signal as mentioned above, and inquires out IMSI of the mobile terminal 110 in a terminal information DB (S205). That is, the terminal switching server 170 inquires out IMSI of the mobile terminal 110 in the terminal information DB using the telephone number (for example, MSISDN) of the mobile terminal 110.

Next, the terminal switching server 170 requests a location information of the telematics terminal 120 (for example, the switching center (MSC1 of FIG. 2) 140 information) to the home location register (HLR1 of FIG. 2) 160 that stores a profile information of the telematics terminal 120, and receives a response to the request (S207 and S209).

Subsequently, the terminal switching server 170 transmits a terminal switching command including the location information of the telematics terminal 120 (for example, the switching center (MSC1) 140 information) to the home location register (HLR2 of FIG. 2) 160 that stores a profile information of the mobile terminal 110 (S211).

The home location register (HLR2) 160 that stores a profile information of the mobile terminal 110 receives the terminal switching command from the terminal switching server 170, inactivates a location information of the mobile terminal 110 stored and managed therein, and sets and activates the location information of the telematics terminal 120 included in the terminal switching command (S213). That is, not an actual location information of the mobile terminal 110, but the location information of the telematics terminal 120 is set as a location information of the mobile terminal 110 in the home location register (HLR2) 160 that stores a profile information of the mobile terminal 110, and the location information of the telematics terminal 120 is activated, so that a service signal destined for the mobile terminal 110 is transmitted to the telematics terminal 120.

Next, the home location register (HLR2) 160 that stores a profile information of the mobile terminal 110 transmits the profile information of the mobile terminal 110 to the switching center (MSC1) 140, where the telematics terminal 120 is located (S215). The switching center (MSC1) 140, where the telematics terminal 120 exists, receives the profile information of the mobile terminal 110, and changes the profile information of the telematics terminal 120 into the received profile information of the mobile terminal 110 (S217). That is, the switching center (MSC1) 140 maps the telephone number (for example, MSISDN) of the mobile terminal 110 to the IMSI of the telematics terminal 120, and stores and manages the mapping information. Preferably, the information of the telematics terminal 120 is stored and managed in a visitor location register (VLR). And, preferably the home location register (HLR2) 160 maps the profile information of the mobile terminal 110 to the IMSI of the telematics terminal 120, and transmits the mapping information to the switching center (MSC1) 140, and the switching center (MSC1) 140 replaces the profile information of the telematics terminal 120 with the received information. Finally, the switching center (MSC1) 140 does not map the profile information of the telematics terminal 120, but the profile information of the mobile terminal 110 to the IMSI of the telematics terminal 120 and stores and manages the mapping information.

A call destined for the mobile terminal 110 is transmitted to the switching center (MSC1) 140, where the telematics terminal 120 exists, by the home location register (HLR2) 160 that stores a profile information of the mobile terminal 110. The switching center (MSC1) 140 searches for IMSI of the telematics terminal 120 in the mapping information using a called party information (for example, MSISDN of the mobile terminal 110) of the transmitted call, performs paging on the telematics terminal 120 using the searched IMSI, and transmits to the telematics terminal 120 an incoming call to be transmitted to the mobile terminal 110. Thus, the mobile subscriber can be provided with a service destined for the mobile terminal 110 using the telematics terminal 120, not using the mobile terminal 110.

Meanwhile, the home location register (HLR2) 160 that stores a profile information of the mobile terminal 110 transmits a mobile terminal inactivation command to the switching center (MSC2 of FIG. 2) 140, where the mobile terminal 110 exists (S219). According to the inactivation command, the switching center (MSC2) 140 intercepts a service destined for the mobile terminal 110 and intercepts a call originated from the mobile terminal 110, so that the mobile subscriber can not use a service by the mobile terminal 110.

As mentioned above, according to the terminal switching method of the present invention, after the mobile subscriber gets in the vehicle, the mobile subscriber can be provided with a service destined for the mobile terminal 110 through the telematics terminal 120, instead of the mobile terminal 110. Therefore, the present invention can prevent a car accident that may occur during driving.

Figure 3:
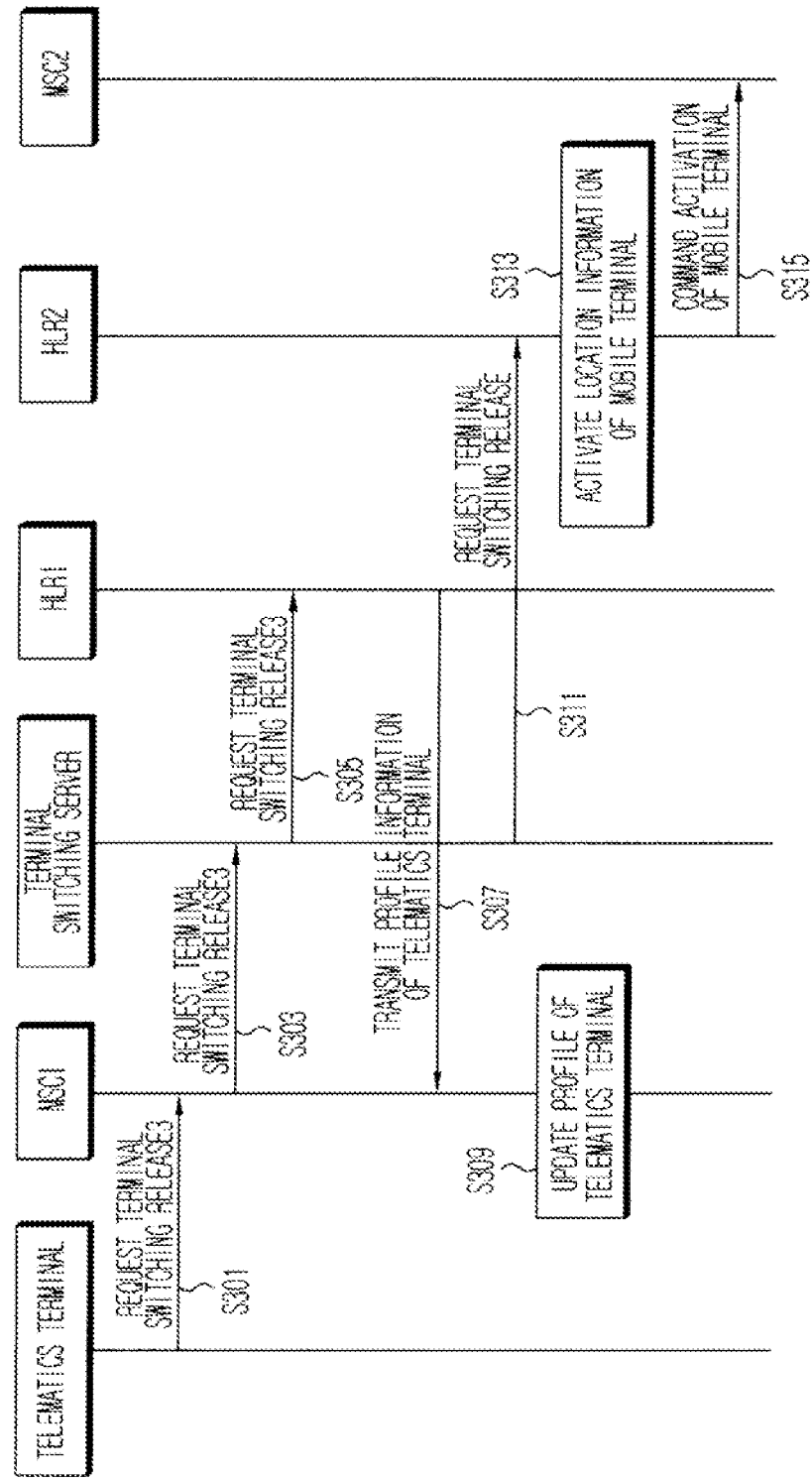
FIG. 3 is a flow chart illustrating a step for releasing terminal switching in the terminal switching service system according to an embodiment of the present invention.

FIG. 3 is a flow chart illustrating a step for releasing terminal switching in the terminal switching service system according to an embodiment of the present invention.

As shown in FIG. 3, first, when a mobile subscriber uses the terminal-switched telematics terminal 120 and wants to switch from the telematics terminal 120 to the mobile terminal 110 again, the mobile subscriber requests terminal switching release to the terminal switching server 170 using the telematics terminal 120. In the case of terminal switching release request to the terminal switching server 170 using the telematics terminal 120, the telematics terminal 120 transmits to the switching center (MSC1 of FIG. 3) 140 a terminal switching release request signal including an identification information of the telematics terminal 120 via a wireless section (S301). At this time, in the case that the engine of the vehicle stops, the telematics terminal 120 may automatically attempt terminal switching release. That is, when the engine of the vehicle stops, an electronic control unit mounted in the vehicle recognizes that the engine of the vehicle stops and transmits a control signal to the telematics terminal 120 according to recognition. The telematics terminal 120 may automatically request terminal switching release to the terminal switching server 170.

Subsequently, the switching center 140 transmits to the terminal switching server 170 the terminal switching release request signal received from the telematics terminal 120 (S303). At this time, preferably the switching center 140 transmits the terminal switching release request signal to the home location register 160, receives a routing information toward the terminal switching server 170 in response to the terminal switching release request signal, and transmits the terminal switching release request signal to the terminal switching server 170.

Next, the terminal switching server 170 transmits the terminal switching release request signal to the home location register (HLR1 of FIG. 3) 160 that stores a profile information of the telematics terminal 120 (S305). Then, the home location register (HLR1) 160 that stores a profile information of the telematics terminal 120 transmits the profile information of the telematics terminal 120 to the switching center (MSC1) 140, where the telematics terminal 120 is located (S307).

The switching center (MSC1) 140, where the telematics terminal 120 is located, receives the profile information of the telematics terminal 120, and restores a profile information of the telematics terminal 120 stored therein using the received profile information of the telematics terminal 120 (S309). That is, the switching center (MSC1) 140 mapped a telephone number (for example, MSISDN) of the mobile terminal 110 to IMSI of the telematics terminal 120 in the profile information of the telematics terminal 120, and stored and managed the mapping information. However, according to terminal switching release of the mobile subscriber, the switching center (MSC1) 140 restores the telephone number of the mobile terminal 110 mapped to the IMSI of the telematics terminal 120 to a telephone number of the telematics terminal 120.

Meanwhile, the terminal switching server 170 transmits the terminal switching release request signal to the home location register (HLR2 of FIG. 3) 160 that stores a profile information of the mobile terminal 110 (S311). That is, the terminal switching server 170 extracts information of the mobile terminal 110 using a terminal switching service subscriber information and information of the telematics terminal 120 stored and managed therein, and transmits the terminal switching release request signal to the home location register (HLR2) 160 that stores a profile information of the mobile terminal 110, based on the extracted information.

The home location register (HLR2) 160 that stores a profile information of the mobile terminal 110 receives the terminal switching release request signal from the terminal switching server 170, activates a location information of the mobile terminal 110 stored and managed therein, and inactivates a location information of the telematics terminal 120 (S313). That is, not an actual location information of the mobile terminal 110, but the location information of the telematics terminal 120 was set as a location information of the mobile terminal 110 in the home location register (HLR2) 160 that stores a profile information of the mobile terminal 110, but the location information of the mobile terminal 110 is restored to an actual location information of the mobile terminal 110. Thus, a service signal destined for the mobile terminal 110 can be transmitted to the mobile terminal 110 normally.

Meanwhile, the home location register (HLR2) 160 that stores a profile information of the mobile terminal 110 transmits a mobile terminal activation command to the switching center (MSC2 of FIG. 3) 140, where the mobile terminal 110 is located (S315). Thus, the switching center (MSC2) 140 transmits to the mobile terminal 110 a service destined for the mobile terminal 110, and allows a call originated from the mobile terminal 110 to provide an original service.

Figure 4:
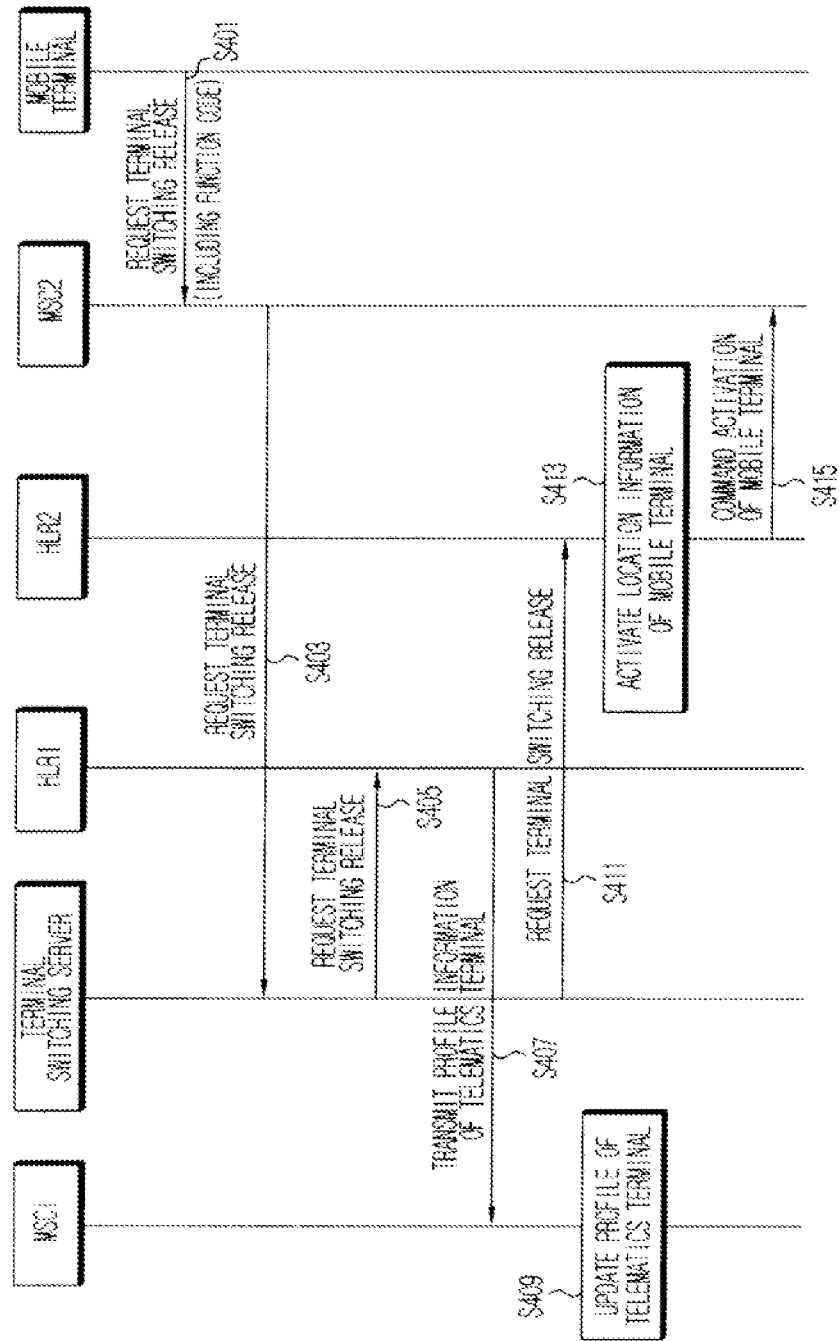
FIG. 4 is a flow chart illustrating a step for releasing terminal switching in the terminal switching service system according to another embodiment of the present invention.

FIG. 4 is a flow chart illustrating a step for releasing terminal switching in a terminal switching service system according to another embodiment of the present invention, and unlike an embodiment of FIG. 3, terminal switching is released using a service-intercepted mobile terminal 110

As shown in FIG. 4, first, to restore the terminal-switched telematics terminal 120 to the mobile terminal 110 and use the mobile terminal 110 again, a mobile subscriber inputs a function code (for example, \*\*44) for terminal switching release into the mobile terminal 110 and presses a "begin call" button. Then, a terminal switching release request including the function code is transmitted from the mobile terminal 110 to the switching center (MSC2 of FIG. 4) 140 (S401). After terminal switching is made, the switching center (MSC2) 140 intercepts a call originated from the mobile terminal 110, but in the case that a feature code for terminal switching release is included in an outgoing call, allows origination of the outgoing call.

Then, the switching center (MSC2) 140 requests terminal switching release to the terminal switching server 170 based on the function code (S403). At this time, preferably the switching center (MSC2) 140 requests interpretation of the feature code to the home location register 160, receives a routing information toward the terminal switching server 170 in response to the request, and transmits a terminal switching release request signal to the terminal switching server 170.

Next, the terminal switching server 170 receives the terminal switching release request signal and transmits the terminal switching release request signal to the home location register (HLR1 of FIG. 4) 160 that stores a profile information of the telematics terminal 120, using a terminal switching service subscriber information stored therein (S405). Then, the home location register (HLR1) 160 that stores a profile information of the telematics terminal 120 transmits the profile information of the telematics terminal 120 to the switching center (MSC1 of FIG. 4) 140, where the telematics terminal 120 is located (S407).

The switching center (MSC1) 140, where the telematics terminal 120 is located, receives the profile information of the telematics terminal 120, and restores information of the telematics terminal 120 stored therein using the received profile information of the telematics terminal 120 (S409). That is, the switching center (MSC1) 140, where the telematics terminal 120 is located, mapped a telephone number (for example, MSISDN) of the mobile terminal to IMSI of the telematics terminal 120 in the profile information of the telematics terminal 120, and stored and managed the mapping information. However, according to terminal switching release of the mobile subscriber, the switching center (MSC1) 140 restores the identification information of the mobile terminal 110 mapped to the IMSI of the telematics terminal 120 to a telephone number of the telematics terminal 120.

Meanwhile, the terminal switching server 170 transmits the terminal switching release request signal to the home location register (HLR2 of FIG. 4) 160 that stores a profile information of the mobile terminal 110 (S411).

The home location register (HLR2) 160 that stores a profile information of the mobile terminal 110 receives the terminal switching release request signal from the terminal switching server 170 as mentioned above, activates a location information of the mobile terminal 110 stored and managed therein and inactivates a location information of the telematics terminal 120 (S413). That is, not an actual location information of the mobile terminal 110, but the location information of the telematics terminal 120 was set as a location information of the mobile terminal 110 in the home location register (HLR2) 160 that stores a profile information of the mobile terminal 110, but the location information of the mobile terminal 110 is restored to an actual location information of the mobile terminal 110. Thus, a service signal destined for the mobile terminal 110 can be transmitted to the mobile terminal 110 normally.

Meanwhile, the home location register (HLR2) 160 that stores a profile information of the mobile terminal 110 transmits a mobile terminal activation command to the switching center (MSC2) 140, where the mobile terminal 110 is located (S415). Thus, the switching center (MSC2) 140 transmits to the mobile terminal 110 a service destined for the mobile terminal 110, and allows a call originated from the mobile terminal 110 to provide an original service.

In the case that the mobile subscriber using the terminal-switched telematics terminal 120 gets off the vehicle or the vehicle moves away from a mobile communication service area, terminal switching can not be released by the telematics terminal 120. However, the present invention can release terminal switching by the mobile terminal 110 to solve the above-mentioned disadvantage.

Figure 6:
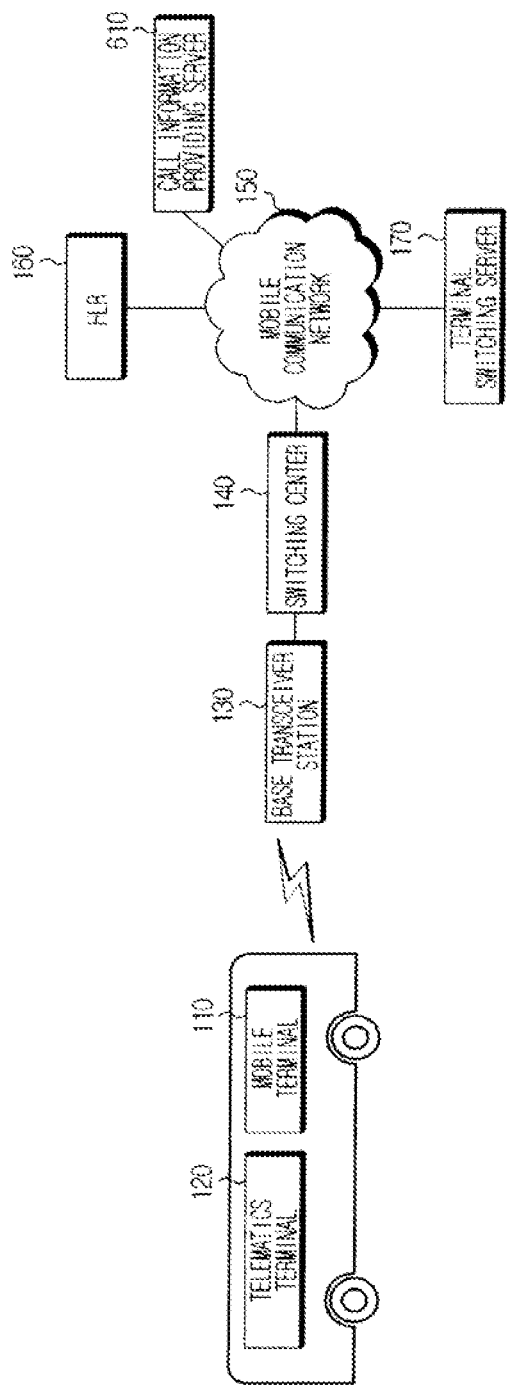
FIG. 6 is a view illustrating a network configuration of a terminal switching service system according to another embodiment of the present invention.

FIG. 6 is a view illustrating a network configuration of a terminal switching service system according to another embodiment of the present invention. Here, an element having the same reference number performs the same function, and its detailed description is omitted and hereinafter a different part is described.

In the case that after a mobile subscriber switches from the mobile terminal 110 to the telematics terminal 120 and uses the telematics terminal 120, the mobile subscriber gets off the vehicle or the vehicle moves away from a mobile communication service area (for example, the vehicle enters an underground parking lot), the telematics terminal 120 is not provided with an incoming call. At this time, in the case that the mobile subscriber gets off the vehicle and goes somewhere else without terminal switching release using the mobile terminal 110, although the mobile terminal 110 enters a service area, the mobile terminal 110 is not provided with an incoming call. A solution to prevent this case is required, which provides the mobile terminal 110 with a call information message of a non-received call to inform the mobile subscriber of the current terminal switching state.

Accordingly, as shown in FIG. 6, the terminal switching service system according to the present invention further comprises a call information providing server 610 for writing and providing a call information message including information of a non-received call.

At this time, in the case that the terminal-switched telematics terminal 120 in use is in a non-receiving state, the home location register 160 requests to the call information providing server 610 transmission of a call information message of a non-received call. And, the switching center 140 intercepts a sending/receiving service of the mobile terminal 110, but temporarily allows a call information message of a non-received call, so that the call information message of a non-received call is transmitted to the mobile terminal 110. For this purpose, a related information is set in the home location register 160 so that the call information message of a non-received call can be transmitted to the mobile terminal 110. And, the call information providing server 610 transmits to the switching center 140 the call information message of a non-received call together with an indicator representing that the corresponding message is a call information message of a non-received call. Thus, the switching center 140 allows the mobile terminal 110 to transmit the call information message based on the indicator.

Figure 7:
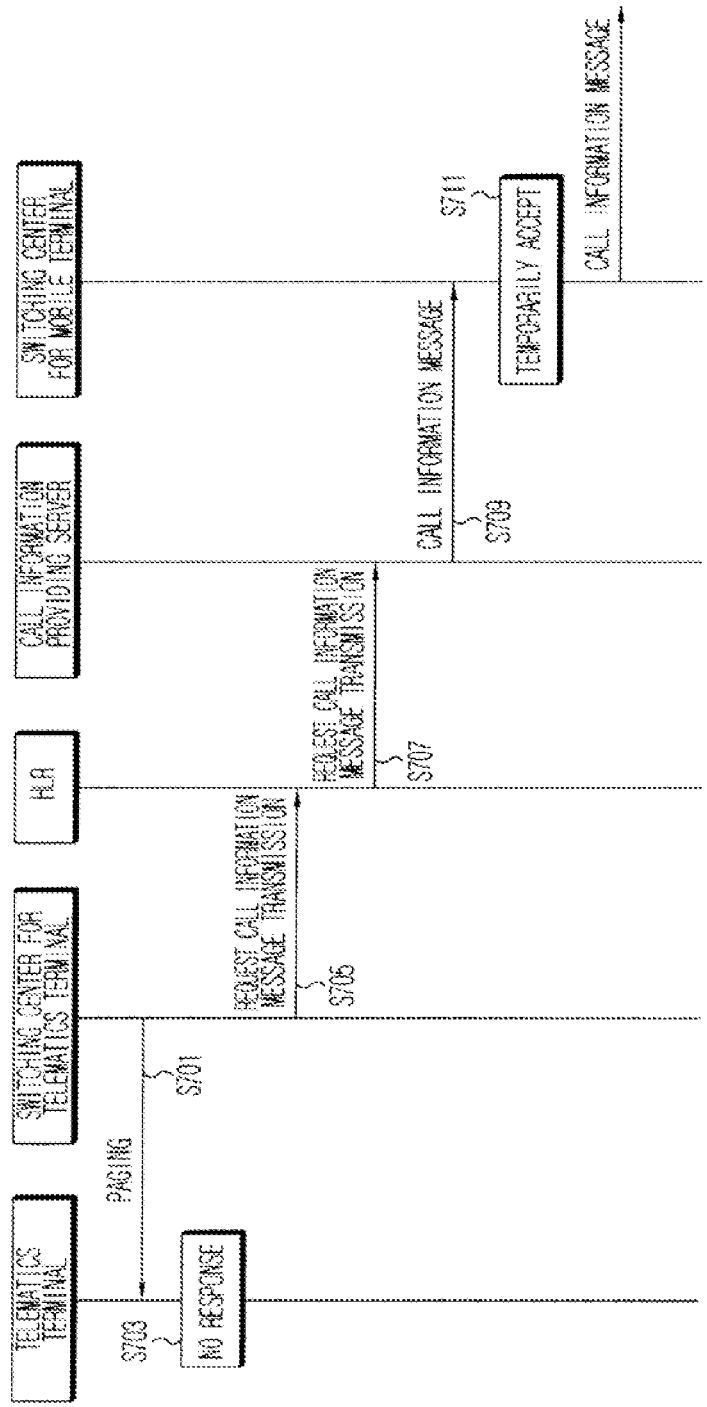
FIG. 7 is a flow chart illustrating a method for transmitting to a mobile terminal a call information message of a non-received call in a non-receiving state of a telematics terminal according to an embodiment of the present invention.

FIG. 7 is a flow chart illustrating a step for transmitting a call information message of a non-received call to a mobile terminal in the case that a terminal-switched telematics terminal is in a non-receiving state.

As shown in FIG. 7, in the case of a call destined for the telematics terminal 120, the switching center 140 for the telematics terminal 120 performs paging on the telematics terminal 120 to attempt to receive the call (S701). At this time, in the case that the telematics terminal 120 does not respond to the call, for example the telematics terminal 120 moves away from a service area (S703), the switching center 140 for the telematics terminal 120 requests transmission of a call information message of a non-received call to the home location register 160 that stores a profile information of the mobile terminal 110 (S705).

The home location register 160 that stores a profile information of the mobile terminal 110 transmits to the call information providing server 610 the call information message transmission request including a calling party information and a called party information (that is, information of the mobile terminal 110) (S707). Here, the home location register 160 should let a call information message of a non-received call be transmitted to the telematics terminal 120 according to terminal switching activation information of the mobile subscriber, but is preset so that a call information message of a non-received call is transmitted to the mobile terminal 110.

The call information providing server 610 receives the call information message transmission request from the home location register 160, synthesizes the calling party information and the called party information included in the call information message transmission request, and writes a call information message of a non-received call. And, the call information providing server 610 transmits the written call information message to the switching center 140, where the mobile terminal 110 is located, through a message center (S709). At this time, the call information message includes an indicator representing that the corresponding message is a call information message of a non-received call.

The switching center 140, where the mobile terminal 110 is located, temporarily allows the mobile terminal 110 to receive the corresponding call information message according to indicator included in the call information message (S711), and transmits the call information message to the mobile terminal 110 (S713). Accordingly, the mobile subscriber set terminal switching from the mobile terminal 110 to the telematics terminal 120, but receives the call information message of a non-received call by the mobile terminal 110, and thus the mobile subscriber is informed that terminal switching is not released currently and can check an incoming call even in a non-receiving state of the telematics terminal 120. The mobile subscriber releases terminal switching using the mobile terminal 110, and can receive a mobile communication service by the mobile terminal 110.

In the above-mentioned embodiment, the telematics terminal 120 transmits a terminal switching setting request/terminal switching release request through a circuit switching network, and then the terminal switching setting signal/the terminal switching release request signal is transmitted to the switching center 140. And, a mobile terminal activation or inactivation information is set in the switching center 140, and the switching center 140 allows or intercepts a circuit switching signal destined for the mobile terminal 110. And, a profile information of the mobile terminal 110 is stored in the switching center 140 as a profile information of the telematics terminal 120, and thus the switching center 140 transmits to the telematics terminal 120 a circuit switching signal to be transmitted to the mobile terminal 110. However, the present invention is not limited in this regard, and the present invention may be applied to a packet switching signal in the same way. That is, the telematics terminal 120 may set or release terminal switching through a packet switching network. In this case, a terminal switching setting signal/terminal switching release request signal is transmitted to SGSN (Serving GPRS Support Node) that provides a packet service, consequently to the terminal switching server 170, and in the same way as the switching center 140, a mobile terminal activation/inactivation information may be set in the SGSN and a profile information of the telematics terminal 120 may be set in the SGSN. Thus, a packet service provided to the mobile terminal 110 is intercepted or allowed, and the packet service provided to the mobile terminal 110 is provided to the telematics terminal 120.

The above-mentioned method according to the present invention may be incorporated as a computer readable code in a computer readable medium. The computer readable medium includes all kinds of storage devices for storing data readable by a computer system. For example, the computer readable medium is CD-ROM (Compact Disc Read Only Memory), RAM (Random Access Memory), ROM (Read Only Memory), a floppy disc, a hard disc or a magneto-optical disc. The above-mentioned process is well known to ordinary persons skilled in the art, and its detailed description is omitted.

As such, it should be understood that the detailed description and specific examples, while indicating preferred embodiments of the invention, are given by way of illustration only, since various changes and modifications within the spirit and scope of the invention will become apparent to those skilled in the art from this detailed description.

INDUSTRIAL APPLICABILITY

According to the present invention, when a mobile subscriber gets in a vehicle, the mobile subscriber switches from a mobile terminal to a telematics terminal and uses the terminal-switched telematics terminal, and thus a car accident can be prevented. And, in the case of terminal switching to a telematics terminal, the mobile subscriber can release terminal switching by the mobile terminal as well as by the telematics terminal, so that the mobile subscriber can easily use a terminal switching service. Further, in the case that the telematics terminal moves away from a service area, a call information message of a non-received call is provided to the mobile terminal, and thus the mobile subscriber can release terminal switching immediately and check a call received before terminal switching, so that the mobile subscriber can not miss an important call.

The invention claimed is:

1. A method for providing a call information message of a non-received call in a terminal transfer service, which provides a call information message of a non-received call in a terminal switching state from a mobile terminal to a telematics terminal in a mobile communication system, the method comprising:
   (a) processing a call destined for the mobile terminal by the telematics terminal;
   (b) in the case that the telematics terminal is in a non-receiving state, writing a call information message of a non-received call; and
   (c) temporarily allowing the mobile terminal to receive the written call information message and transmitting the written call information message to the mobile terminal.

2. The method for providing a call information message of a non-received call in a terminal transfer service according to claim 1,
   wherein the step (b) inserts an indicator into the call information message, where the indicator represents that a corresponding message is a call information message of a non-received call, and
   wherein the step (c) temporarily allows the mobile terminal to receive the call information message based on the indicator.

3. The method for providing a call information message of a non-received call in a terminal transfer service according to claim 1,
   wherein the step (b) includes:
   a switching center for the telematics terminal requesting call information message transmission to a home location register storing a profile of the mobile terminal;
   the home location register requesting call information message transmission to a call information providing server; and
   the call information providing server writing a call information message.

4. A system for providing a call information message of a non-received call in a terminal transfer service, which provides a call information message of a non-received call in a terminal switching state from a mobile terminal to a telematics terminal, the system comprising:
   a first switching center serving as a switching center for the telematics terminal and configured to process a call destined for the mobile terminal by the telematics terminal;
   a home location register for storing a profile information of the mobile terminal, and in the case that the telematics terminal is in a non-receiving state, receiving from the first switching center a request for transmission of a call information message of a non-received call;
   a call information providing device for writing a call information message of a non-received call and transmitting the call information message via a message center according to the request of the home location register; and
   a second switching center serving as a switching center for the mobile terminal and configured to receive the call information message, temporarily allowing the mobile terminal to receive the received call information message, and transmitting the call information message to the mobile terminal.

5. The system for providing a call information message of a non-received all in a terminal transfer service according to claim 4,
wherein the second switching center intercepts a mobile communication service of the mobile terminal except the call information message of a non-received call.

6. The system for providing a call information message of a non-received call in a terminal transfer service according to claim 4,
wherein the home location register routes to the first switching center an incoming call of the mobile terminal except the call information message of a non-received call.

7. The method for providing a call information message of a non-received call in a terminal transfer service according to claim 2,
wherein the step (b) includes:
a switching center for the telematics terminal requesting call information message transmission to a home location register storing a profile of the mobile terminal;
the home location register requesting call information message transmission to a call information providing server; and
the call information providing server writing a call information message.

8. The system for providing a call information message of a non-received call in a terminal transfer service according to claim 5,
wherein the home location register routes to the first switching center an incoming call of the mobile terminal except the call information message of a non-received call.

* * * * *